(12) United States Patent
Smith et al.

(10) Patent No.: US 12,105,195 B2
(45) Date of Patent: Oct. 1, 2024

(54) SYSTEMS AND METHODS FOR OBSTACLE AVOIDANCE FOR UNMANNED AUTONOMOUS VEHICLES

(71) Applicant: Alphacore, Inc., Tempe, AZ (US)

(72) Inventors: Joseph Smith, Tempe, AZ (US); Siyang Cao, Tucson, AZ (US)

(73) Assignee: Alphacore, Inc., Tempe, AZ (US)

( * ) Notice: Subject to any disclaimer, the term of this patent is extended or adjusted under 35 U.S.C. 154(b) by 367 days.

(21) Appl. No.: 17/589,807

(22) Filed: Jan. 31, 2022

(65) Prior Publication Data

US 2023/0243965 A1    Aug. 3, 2023

(51) Int. Cl.
| | |
|---|---|
| *G01S 13/93* | (2020.01) |
| *G01S 13/86* | (2006.01) |
| *G01S 13/933* | (2020.01) |
| *G05D 1/00* | (2006.01) |
| *G05D 1/10* | (2006.01) |
| *H01Q 9/04* | (2006.01) |

(52) U.S. Cl.
CPC .......... *G01S 13/933* (2020.01); *G01S 13/867* (2013.01); *G05D 1/106* (2019.05); *H01Q 9/0414* (2013.01)

(58) Field of Classification Search
CPC ................ G01S 13/933; G01S 13/867; H01Q 9/0414; G05D 1/106
See application file for complete search history.

(56) References Cited

U.S. PATENT DOCUMENTS

| | | |
|---|---|---|
| 6,678,394 B1 | 1/2004 | Nichani |
| 9,097,532 B2 | 8/2015 | Kotaba et al. |
| 9,983,306 B2 | 5/2018 | Zeng et al. |
| 10,668,919 B2 | 6/2020 | Takahashi et al. |
| 10,745,132 B1* | 8/2020 | Kimchi ................. B64U 10/13 |
| 11,027,653 B2 | 6/2021 | Kim et al. |
| 2011/0169943 A1 | 7/2011 | Bachman, II et al. |
| 2016/0373699 A1* | 12/2016 | Torres ...................... G08G 1/04 |
| 2017/0301248 A1 | 10/2017 | Silverman et al. |

(Continued)

FOREIGN PATENT DOCUMENTS

KR    102196733 B1 *  12/2020  ............. B64C 39/02

OTHER PUBLICATIONS

Alsager. "Design and Analysis of Microstrip Patch Antenna Arrays," University College of Borås School of Engineering, pp. 1-80 (Year: 2011).*

(Continued)

*Primary Examiner* — Bernarr E Gregory
*Assistant Examiner* — Samarina Makhdoom
(74) *Attorney, Agent, or Firm* — LOZA & LOZA, LLP

(57) ABSTRACT

Collision avoidance is an important issue for unmanned autonomous vehicles (UAVs). As such, UAVs can be outfitted with a simple and inexpensive sensor for use in collision avoidance. The sensor can be attached to a gimbal and can include a RADAR transmit antenna, a RADAR receive antenna, and an optical camera. The RADAR transmit antenna and RADAR receive antenna are part of a RADAR system. The optical camera and the RADAR system are bore sighted to one another by aligning their fields of view. The optical camera captures an image of a target when the RADAR system indicates the target is in the field of view. The RADAR system and image data can be used to determine a target trajectory. The target trajectory can be used to avoid a collision with the target.

20 Claims, 7 Drawing Sheets

(56) References Cited

U.S. PATENT DOCUMENTS

| | | | |
|---|---|---|---|
| 2019/0096205 A1* | 3/2019 | Blech | G08B 13/19695 |
| 2020/0117197 A1 | 4/2020 | Oudwan et al. | |
| 2020/0225684 A1* | 7/2020 | Anderson | B64U 70/95 |
| 2020/0284901 A1* | 9/2020 | Tierney | G01S 13/584 |
| 2021/0296764 A1* | 9/2021 | Shams | H01Q 3/385 |
| 2021/0318445 A1* | 10/2021 | Sox | G08G 5/0052 |

OTHER PUBLICATIONS

Ahmed, Shibbir et al. "State-of-the-Art Analysis of Obstacle Avoidance Methods from the Perspective of an Agricultural Sprayer UAV's Operation Scenario", Agronomy 2021, 11, 1069. https://doi.org/10.3390/agronomy11061069, (2021), 35 pgs.

Bigazzi, Luca et al. "Development of Non Expensive Technologies for Precise Maneuvering of Completely Autonomous Unmanned Aerial Vehicles", Sensors 2021, 21, 391. https://doi.org/10.3390/s21020391, (2021), 24 pgs.

Wei, Zhiqing et al. "MmWave Radar and Vision Fusion for Object Detection in Autonomous Driving: A Review", Aug. 12, 2021, 22 pgs.

Yeong, De Jong et al. "Sensor and Sensor Fusion Technology in Autonomous Vehicles: A Review", Sensors 2021, 21, 2140. https://doi.org/10.3390/s21062140, (2021).

Yu, Hang et al. "Autonomous Obstacle Avoidance for UAV based on Fusion of Radar and Monocular Camera", 2020 IEEE/RSJ International Conference on Intelligent Robots and Systems (IROS), Oct. 25-29, 2020, Las Vegas, NV, USA (Virtual), IEEE, (2020), pp. 5954-5961.

* cited by examiner

SYSTEMS AND METHODS FOR OBSTACLE AVOIDANCE FOR UNMANNED AUTONOMOUS VEHICLES

FIELD OF THE INVENTION

The invention relates generally to target detection, object detection, object avoidance, cameras, radars, sensor fusion, unmanned vehicles, unmanned aerial vehicles, and to sensors used by unmanned vehicles for object detection and avoidance.

BACKGROUND

The very first aircraft used an imaging system, the pilot's eyes, for object detection and avoidance. Technology has advanced ever since. Current technologies include systems using cameras, radio detection and ranging (RADAR), and light detection and ranging (LIDAR). Two technologies are currently advancing that require vehicles to sense and avoid targets. Specifically, the ability to detect and avoid objects can improve the autonomy and survivability of an unmanned vehicle (UV) or unmanned aerial vehicle (UAV). Even more stringent requirements may be required of vehicles that are autonomous and that are carrying people. In many senses, object detection and avoidance can be considered to be a mature technology because systems based on cameras, RADARs, LIDARs, etc. have been deployed for decades. However, the number of autonomous and semi autonomous vehicles is increasing and is expected to explode, thereby creating a need for object detection and avoidance systems that are inexpensive and amenable to mass production.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented by a system. The system can include a gimbal, a RADAR system that includes a RADAR transmit antenna attached to the gimbal and a RADAR receive antenna attached to the gimbal, and an optical camera attached to the gimbal, wherein the gimbal moves the RADAR transmit antenna, the RADAR receive antenna, and the optical camera in unison, and the RADAR system and the optical camera are bore-sighted to each other.

Another aspect of the subject matter described in this disclosure can be implemented by a method. The method can include using a gimbal to move a RADAR transmit antenna that is attached to the gimbal, a RADAR receive antenna that is attached to the gimbal, and an optical camera that is attached to the gimbal. The method can also include determining that a target is present in response to receiving a RADAR signal that is transmitted from the RADAR transmit antenna and then reflected by the target, using the optical camera to acquire a camera image, and identifying the pixels in the camera image that correspond to the target wherein the gimbal moves the RADAR transmit antenna, the RADAR receive antenna, and the optical camera in unison.

Yet another aspect of the subject matter described in this disclosure can be implemented by a system. The system can include a RADAR system that includes a RADAR transmit antenna and a RADAR receive antenna, an optical camera, a means for bore sighting the RADAR system and the optical camera to each other, and a means for simultaneously aiming the RADAR transmit antenna, the RADAR receive antenna, and the optical camera at a location.

In some implementations of the methods and devices the RADAR transmit antenna and the RADAR receive antenna are tuned for 24 GHz. In some implementations of the methods and devices the gimbal is attached to an unmanned aerial vehicle (UAV), and the gimbal moves the RADAR transmit antenna, the RADAR receive antenna, and the optical camera relative to the UAV. In some implementations of the methods and devices the implementation includes the unmanned aerial vehicle (UAV). In some implementations of the methods and devices the implementation includes an onboard processing circuit, wherein the onboard processing circuit is on board the UAV, and the onboard processing circuit determines that the target and the UAV are on a collision course.

In some implementations of the methods and devices the gimbal rotates the RADAR transmit antenna, the RADAR receive antenna, and the optical camera on an axis perpendicular to a plane. In some implementations of the methods and devices the RADAR transmit antenna is a transmit patch antenna that has a transmit antenna height that is parallel to the axis and a transmit antenna width that is parallel to the transmit antenna height, and the transmit antenna width is at least twice the transmit antenna height. In some implementations of the methods and devices the RADAR receive antenna is a receive patch antenna that has a receive antenna height that is parallel to the axis and a receive antenna width that is parallel to the receive antenna height, and the receive antenna height is at least twice the receive antenna width.

In some implementations of the methods and devices the implementation includes a plurality of receive patch antennas that includes the RADAR receive antenna, wherein the receive patch antennas are fixedly attached to the gimbal and have a plurality of different fields of view. In some implementations of the methods and devices the receive patch antennas are arranged vertically with a first one of the receive patch antennas above a second one of the receive patch antennas and with a third one of the receive patch antennas below the second one of the receive patch antennas. In some implementations of the methods and devices the receive patch antennas are bore sighted to the optical camera.

In some implementations of the methods and devices the RADAR detects a target that reflects a RADAR signal transmitted by the RADAR transmit antenna and received by the RADAR receive antenna, the optical camera acquires a camera image that includes a target image that is an image of the target, and a processing circuit that is operatively coupled to the RADAR system and to the optical camera identifies a the target image, wherein the target images is a plurality of pixels in the camera image that correspond to the target.

In some implementations of the methods and devices the gimbal is attached to an unmanned aerial vehicle (UAV), and the gimbal moves the RADAR transmit antenna, the RADAR receive antenna, and the optical camera relative to the UAV. In some implementations of the methods and devices the method includes determining, by an onboard processing circuit, that the target and the UAV are on a collision course, wherein the onboard processing circuit is on board the UAV. In some implementations of the methods and devices the RADAR transmit antenna, the RADAR receive antenna, and the optical camera are bore sighted to one another.

In some implementations of the methods and devices the method includes using a RADAR system to identify a zone that contains the target, using the optical camera to obtain a camera image of the zone, and determining a target location within the camera image, wherein the RADAR system includes the RADAR transmit antenna and the RADAR receive antenna. In some implementations of the methods and devices the RADAR system includes a plurality of RADAR receive antennas that includes the RADAR receive antenna, and the RADAR receive antennas are fixedly attached relative to one another and have a plurality of fields of view that are not identical fields of view. In some implementations of the methods and devices a first one of the fields of view has a first elevation, and a second one of the fields of view has a second elevation that is lower than the first elevation.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements. Additionally, in some cases, reference numbers are not repeated in each figure in order to preserve the clarity and avoid cluttering of the figures.

DETAILED DESCRIPTION

Figure 1:
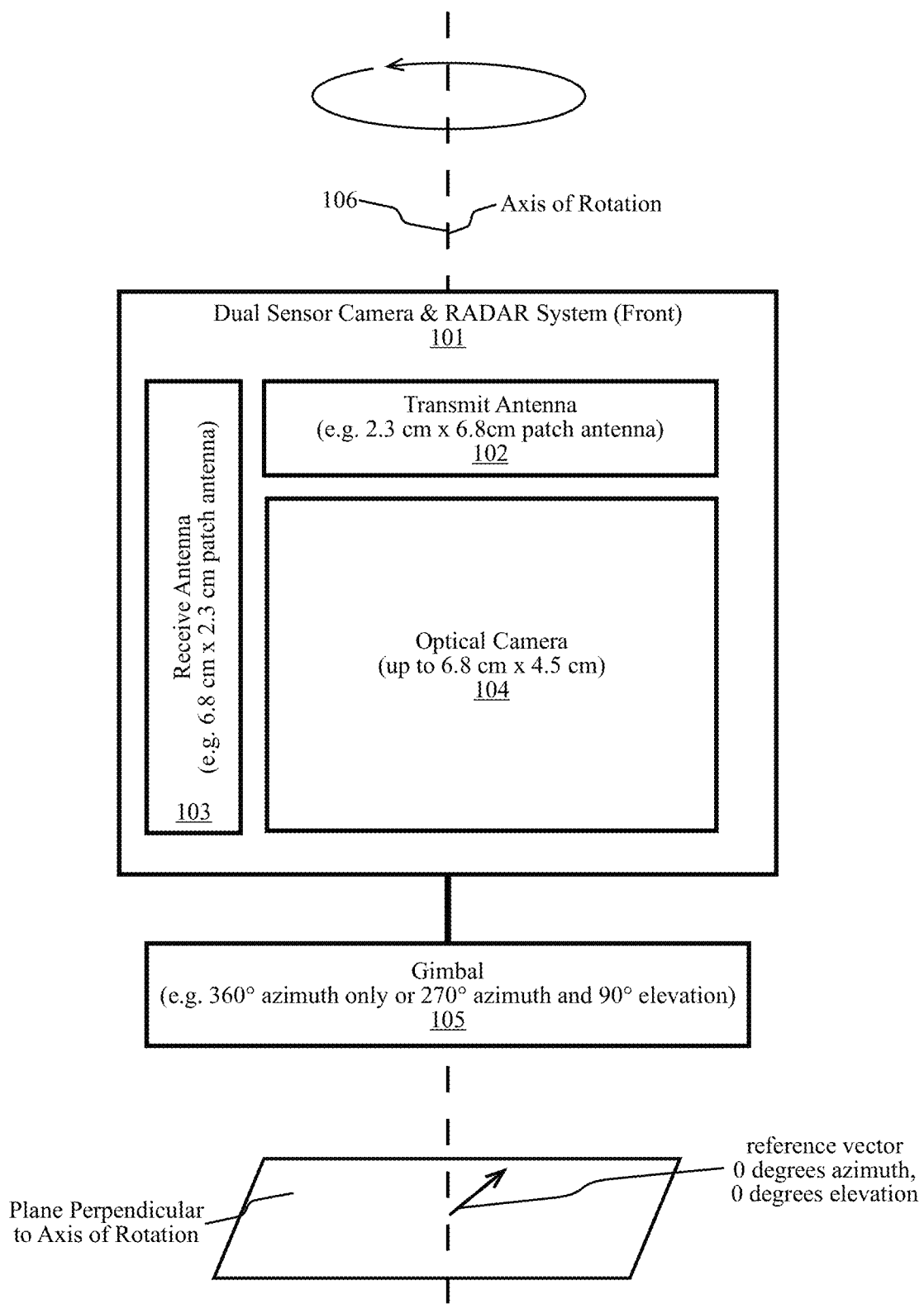
FIG. 1 is a diagram illustrating a front view of a sensor system that includes an optical camera and a RADAR system that are bore sighted to each other according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The number of autonomous and semi autonomous vehicles is expected to proliferate and such vehicles are expected to perform many simple and routine tasks such as transporting goods and people. The performance of routine tasks requires high levels and safety while also being affordable. A sensor that can be used for object detection and avoidance can have an optical camera (e.g., imaging camera producing images or a video stream) and a RADAR system. The RADAR system can be used to determine that there is an object present in a general area and the camera can precisely locate the object. Such a system is particularly useful for UAVs because there is less clutter (e.g., ground clutter) as the elevation above ground increases.

A dual sensor can have two patch antennas and a camera. For example, the patch antennas may be patterns on a circuit board and the camera's sensor may be an electronic chip that is bonded to, mounted on, soldered to, or otherwise attached to the circuit board. Another example is that the patch antennas and the camera sensor are on different substrates that are attached to a plate or a frame. One of the patch antennas can be a RADAR transmit antenna and the other can be a RADAR receive antenna. As such, the field of view of the RADAR system covers the volume into which the RADAR transmit antenna transmits RADAR signals and from which the RADAR receive antenna receives RADAR signals. The volume depends on the orientation and geometry of the antennas.

The RADAR system's field of view can be larger than the camera's field of view. Therefore, the dual sensor can detect that an object exists within the RADAR system's field of view and then the images obtained by the camera can be examined to find the object. Here, the RADAR system can be used to determine that an object is somewhere in the RADAR system's field of view and the camera can be used to determine the object's precise location. The RADAR system and the camera can be bore sighted to one another. Bore sighting the RADAR system and the camera to one another means that the field of view of one is inside the field of view of the other.

One of the advantages of the dual sensor is that it can be very inexpensive in comparison to systems that attempt to precisely locate an object using only RADAR or to detect that an object is present using only a camera. Another advantage is that the dual sensor can be small because it can use a small imaging sensor and small patch antennas. Yet another advantage is that the dual sensor is simple and its simplicity leads to robustness.

The dual sensor can be mounted at the nose of a UAV and pointing forward. As such, the dual sensor can detect objects in front of the UAV. Multiple sensors can be mounted on a vehicle and can face multiple directions such that objects at those multiple directions can be detected. The dual sensor can be mounted on a gimbal. Here, the term "gimbal" includes gimbals that only rotate the dual sensor on an axis, gimbals that can change and control azimuth but not elevation, and gimbals that can change and control azimuth and elevation. A single dual sensor being spun or moved on an axis can detect objects in many directions. A single dual sensor being moved in a pattern that includes changes in azimuth and elevation can detect objects in many directions. An advantage of using a gimbal that spins at a set rate is that such a gimbal is very simple, and can be small and inexpensive (e.g., a DC motor and some gears). An advantage of using a gimbal that can control azimuth is that it can steer the dual sensor toward a detected object. Such gimbals are also simple and robust (e.g., a servo).

A RADAR system can detect that an object is within its field of view. In fact, one of the strengths of RADAR systems is that a very simple RADAR system can detect that an object exists somewhere within that field of view. In order to precisely determine the location of the object, the field of view must be small. Certain complex and expensive systems, such as phased array RADARs, obtain precise locations by, in essence, mimicking a large number of simple radars having small fields of view.

A digital camera can be used to precisely determine the location of an object. The camera can take a camera image by imaging the camera's field of view. The object can be located by finding the object's image in the camera image. However, the object's image must be discernable in the camera image. As such, the camera's field of view must be small enough that the object image is discernible within the camera image.

The dual sensor combines a camera and a RADAR system. By using the RADAR system to detect objects, the image processing is simplified. By using the camera to determine a precise location, the RADAR signal processing is simplified. The result is a simple system that is capable of outperforming more complex systems.

FIG. 1 is a diagram illustrating a front view of a sensor system that includes an optical camera 104 and a RADAR system that are bore sighted to each other according to some aspects. The illustrated system is a dual sensor camera and radar system 101. The RADAR system includes a RADAR transmit antenna 102 and a RADAR receive antenna 103. The transmit antenna and the receive antenna can be patch antennas. For example, an optical sensor can be mounted on a circuit board that includes patch antennas. The optical camera 104 can include the optical sensor and a lens. The dual sensor camera and radar system 101 can be attached to a gimbal 105. The gimbal 105 may rotate the dual sensor camera and radar system 101 around an axis of rotation 106. The gimbal may be a device that can only rotate around the axis of rotation at a set speed. The gimbal may be a device that can rotate around the axis of rotation to specified azimuths (e.g., a servo motor). The gimbal may be a device that has a single degree of freedom, specifically rotation around an axis. The gimbal may be a device that has two degrees of freedom: azimuth and elevation. The azimuth can be an angle on a plane perpendicular to the axis of rotation and relative to a reference vector that is also on the plane perpendicular to the axis of rotation. The elevation can be an angle relative to the plane perpendicular to the axis of rotation and relative to a reference angle. The gimbal may be a device that can point the sensor system toward a specific azimuth and elevation. When the dual sensor camera and radar system 101 can be attached to an unmanned vehicle such as a UAV, the reference vector may be the same as the heading of the unmanned vehicle.

Figure 2A:
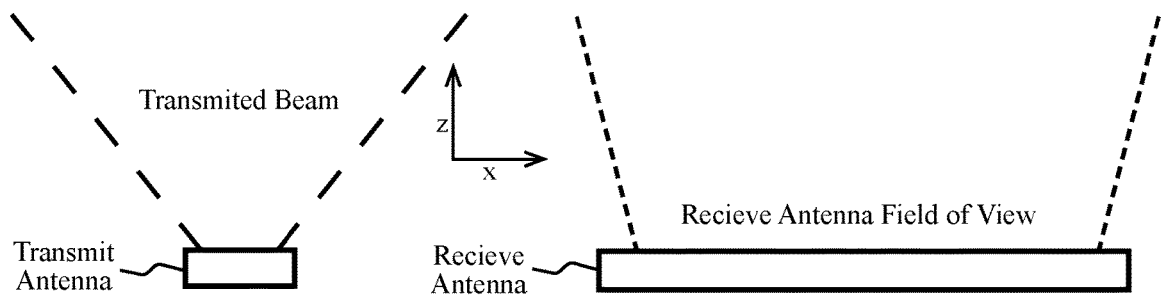
FIG. 2A, FIG. 2B, and FIG. 2C are diagrams illustrating a geometrical relationship between the size and shape of a patch antenna and the size and shape of the patch antenna's transmitted beam or field of view.
Figure 2B:
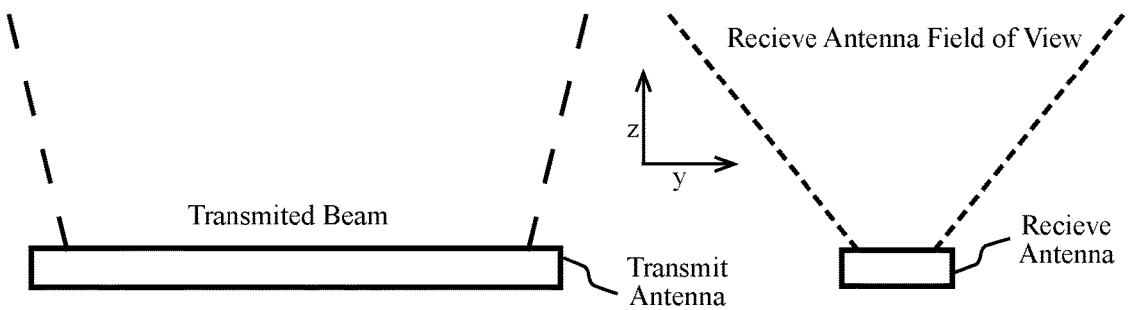
Figure 2C:
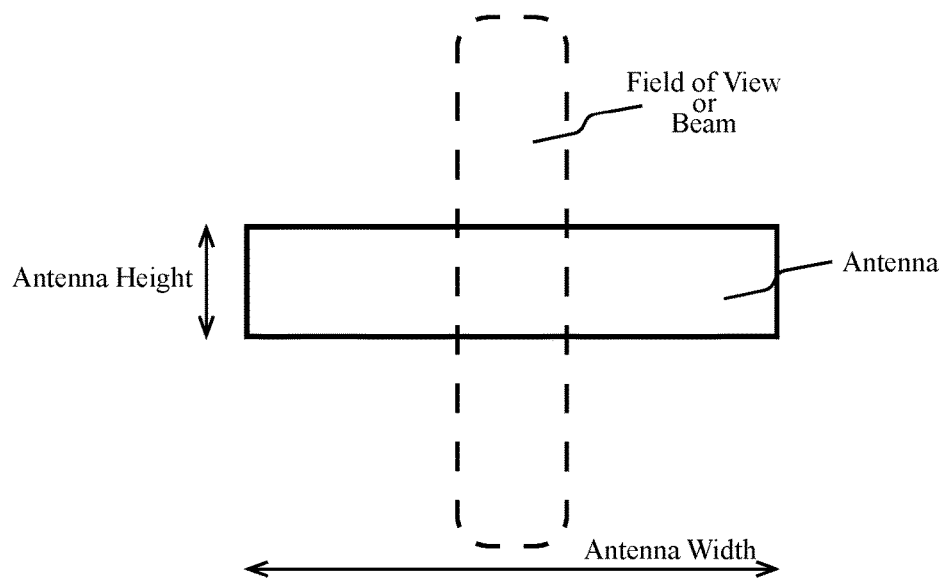

FIG. 2A, FIG. 2B, and FIG. 2C are diagrams illustrating a geometrical relationship between the size and shape of a patch antenna and the size and shape of the patch antenna's transmitted beam or field of view. A receive antenna has a field of view whereas a transmit antenna has a beam.

The field of view of an receive antenna, such as a patch antenna or dish antenna, varies inversely with the size of the receive antenna. For example, a patch antenna laying on a x-y plane can have a width along the x dimension and a height along the y dimension. Increasing the width of the antenna narrows the antenna's field of view with respect to the x dimension. Decreasing the width of the antenna widens the antenna's field of view with respect to the x dimension. Increasing the height of the antenna narrows the antenna's field of view with respect to the y dimension. Decreasing the height of the antenna widens the antenna's field of view with respect to the y dimension.

The size of the transmitted beam of a transmit antenna, such as a patch antenna or dish antenna, varies inversely with the size of the transmit antenna. For example, a patch antenna laying on a x-y plane can have a width along the x dimension and a height along the y dimension. Increasing the width of the antenna narrows the antenna's beam width with respect to the x dimension. Decreasing the width of the antenna widens the antenna's beam width with respect to the x dimension. Increasing the height of the antenna narrows the antenna's beam width with respect to the y dimension.

Decreasing the height of the antenna widens the antenna's beam width with respect to the y dimension.

A RADAR system can have a transmit antenna and a receive antenna. As such, the field of view of the RADAR system is determined by the field of view of the transmit antenna and the field of view of the receive antenna. Those practiced in the art of RADAR systems are familiar with the relations between antenna dimensions and antenna field of view. Those practiced in RADAR systems are also familiar with the relationships between antenna fields of view and RADAR system fields of view.

FIG. 2A illustrates a receive antenna and a transmit antenna wherein the transmit antenna is narrower than the receive antenna. The transmitted beam from the transmit antenna is therefore wider than the field of view of the receive antenna. FIG. 2B illustrates a receive antenna and a transmit antenna wherein the transmit antenna is wider than the receive antenna. The transmitted beam from the transmit antenna is therefore narrower than the field of view of the receive antenna. FIG. 2C illustrates a path antenna having an antenna height and an antenna width. The antenna height is shown as being smaller than the antenna width. If the patch antenna is a receive antenna, then its field of view is wider along the height axis than along the width axis because the antenna is narrower along the height axis than along the width axis. If the patch antenna is a transmit antenna, then its beam is wider along the height axis than along the width axis because the antenna is narrower along the height axis than along the width axis.

Recalling the geometries of the antennas in FIG. 1, the transmit antenna has an antenna height of 2.3 cm and an antenna width of 6.8 cm while the receive antenna has an antenna height of 6.8 cm and an antenna width of 2.3 cm. As a result, the sensor is smaller than if the antennas were square and with height=width=6.8 cm. Furthermore, the RADAR systems field of view is narrower than if the antennas were square and with height=width=2.3 cm. The overall size of the dual sensor system is kept small by placing the rectangular patch antennas above and to the side of the image sensor as shown in FIG. 1. For example, arranging 2.3 cm×6.8 cm patch antennas on a circuit board as shown in FIG. 1 results in a 6.8 cm×4.5 cm area on the circuit board in which an image sensor and other electronics may by mounted.

As a further example, a 10 cm×10 cm footprint has been identified as an ideal size for collision detection sensors mountable on UVs and UAVs. It is therefore desirable to fit the optical camera and two patch antennas within a 10 cm×10 cm area. Arrangements such as that shown in FIG. 1 or FIG. 6 (described below) provide for sensors that fit within the desired footprint. Furthermore, it has been determined that the 10 cm×10 cm foot print pairs well with 24 GHz RADAR signals to provide a RADAR system field of view that is well matched to the optical system field of view. The RADAR transmit antennas and the RADAR receive antennas of such devices may therefore be tuned for 24 GHz.

Figure 3:
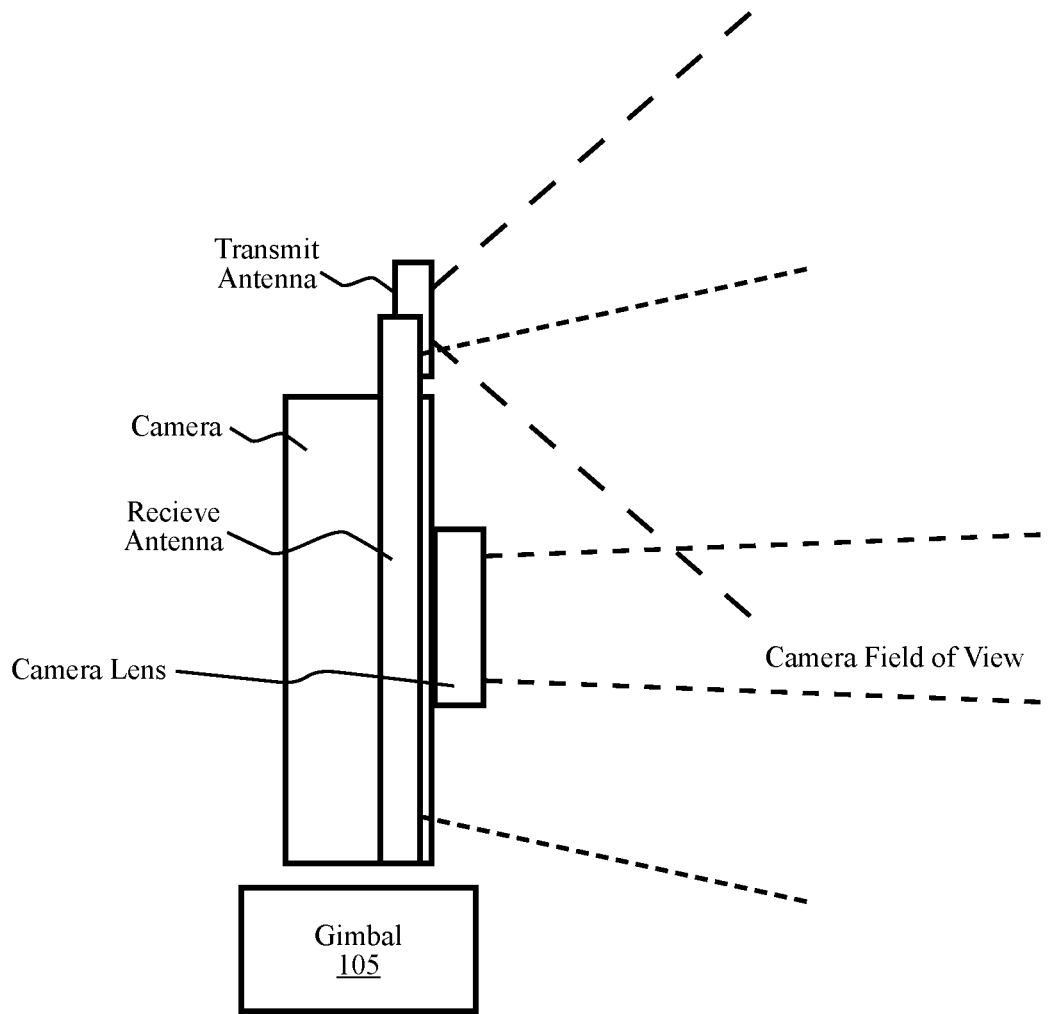
FIG. 3 is a diagram illustrating a side view of a sensor system that includes an optical camera and a RADAR system bore sighted to each other according to some aspects.

FIG. 3 is a diagram illustrating a side view of a sensor system that includes an optical camera and a RADAR bore sighted to each other according to some aspects. For purposes of illustration, the transmit antenna and the receive antenna are shown as not being coplanar. In practice, the transmit antenna and the receive antenna can be coplanar when they are both metalized areas on the surface of a circuit board. The beams, fields of view, and sensor sizes are not to scale. The camera can image targets in the camera field of view. The RADAR system receives return RADAR signals from targets in the RADAR system's field of view. The beam transmitted by the transmit antenna and the field of view of the receive antenna determine the RADAR system's field of view The RADAR system and the optical camera are bore sighted to one another when their fields of view overlap. For example, the field of view of the camera may be inside the field of view of the RADAR system as shown in FIG. 3. Alternatively, the field of view of the RADAR system may be inside the field of view of the camera or the fields of view may be the same size.

Figure 4:
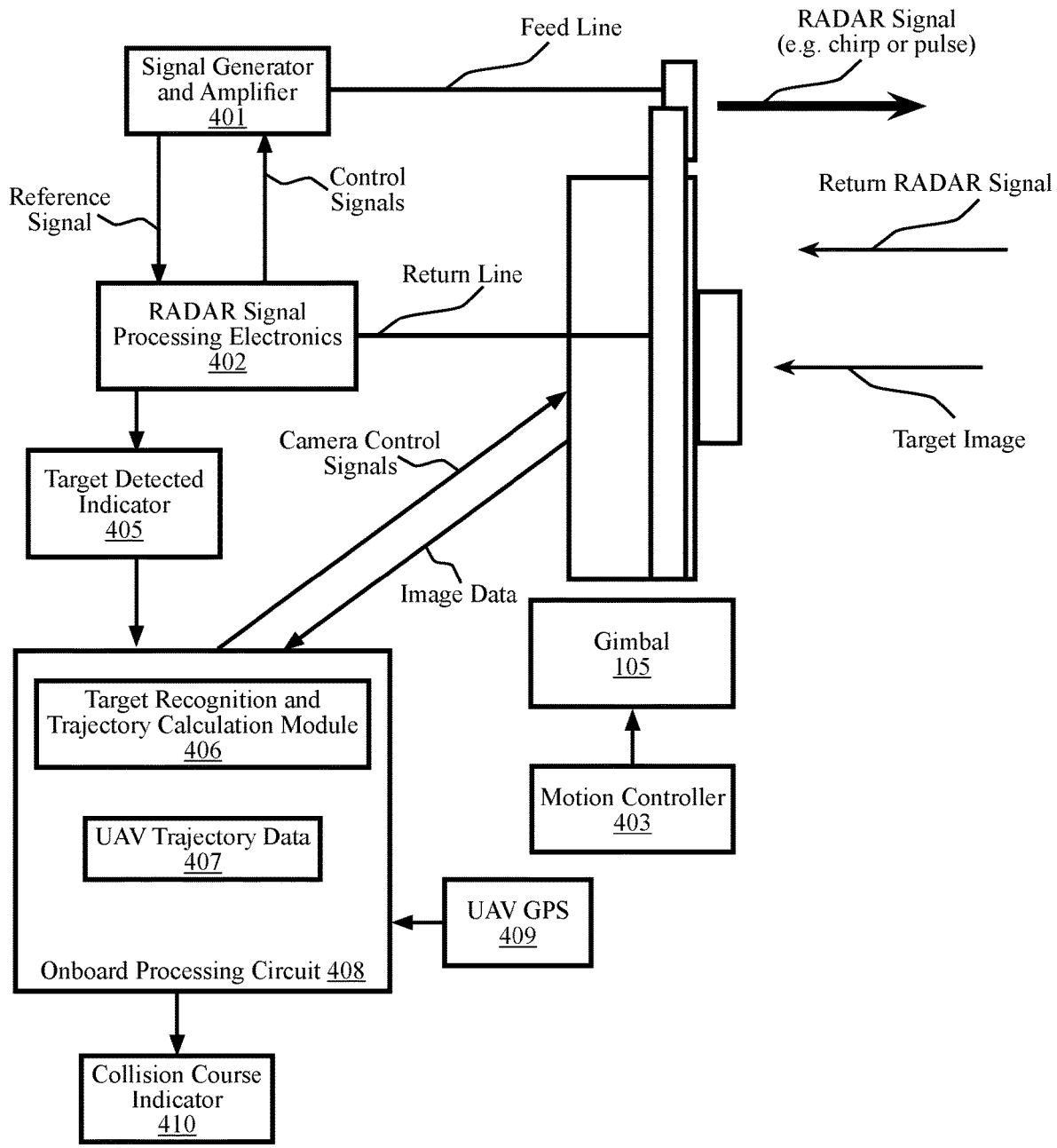
FIG. 4 is a diagram illustrating a sensor system attached to a UAV with an onboard processing circuit that can determine that a UAV and a target are on a collision course according to some aspects.

FIG. 4 is a high level functional diagram illustrating a sensor system that can be attached to a UAV with an onboard processing circuit 408 that can determine that a UAV and a target are on a collision course according to some aspects. RADAR signal processing electronics 402 can send a reference signal and control signals to a signal generator and amplifier 401. The signal generator and amplifier 401 can produce an outgoing signal that is provided to the transmit antenna via a feed line. The transmit RADAR antenna can transmit the outgoing signal as a RADAR signal. The return RADAR signal is the portion of the RADAR signal that has been reflected by a target. The receive RADAR antenna uses a return line to provide the return RADAR signal to the RADAR signal processing electronics. Those practiced in RADAR are familiar with pulse signals that are used for determining target distance and with chirp signals that are used for determining target distance and target speed. The target speed measured is relative to the speed of the RADAR system. The RADAR signal processing electronics 402 can send a target detected indicator 405 to an onboard processing circuit 408 when the target is detected by the RADAR system. The target detected indicator 405 may include the target's speed relative to the UAV. The optical camera may be a video camera that is producing a stream of camera images or can be a camera that produces a single camera image when triggered. Camera images can be stored, transmitted, and received as image data. The onboard processing circuit 408 can receive image data from the camera wherein the image data was acquired when the target was detected by the RADAR system. The onboard processing circuit 408 can perform target recognition and trajectory calculation using, for example, a hardware or software target recognition and trajectory calculation module 406. The onboard processing circuit can locate the target in the image data because the image data is data for a camera image that was obtained while the target was imaged by the camera. A series of camera images can be used to calculate the target's trajectory. The target's speed relative to the UAV that may be provided by the RADAR signal processing electronics can be used to calculate the target's trajectory. The UAV may contain a global positioning system (GPS) device 409 that can be used to determine the UAV's location and the UAVs trajectory. The UAVs trajectory may be stored as UAV trajectory data 407. The onboard processing circuit can compare the UAV's trajectory and the target's trajectory to determine if the UAV and the target are on a collision course. If so, the onboard processing circuit can produce a collision course indicator 410 that indicates that the UAV and the target are on a collision course.

The gimbal 105 may be steered by motion control 403. The onboard processing circuit may instruct the motion controller 403 to aim the dual sensor in specific directions, such as where a target has been seen or is expected to be. Motion control may steer the gimbal 105 along a predetermined path such as in a circle, in a series of circles with different elevations, etc.

Figure 5:
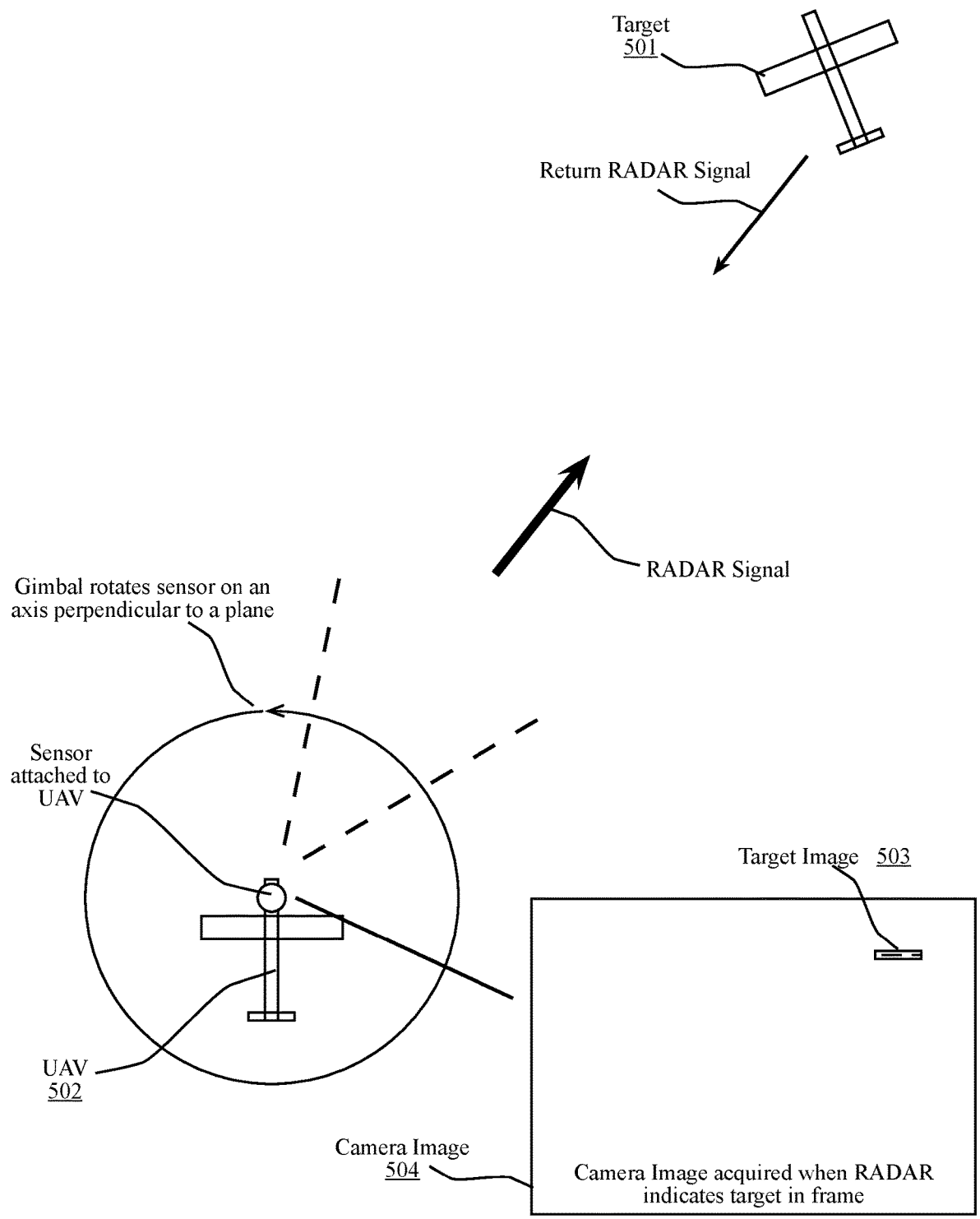
FIG. 5 is a diagram illustrating a sensor system attached to a UAV and being used to determine the trajectory of a target according to some aspects.

FIG. 5 is a diagram illustrating a sensor system attached to a UAV 502 and being used to determine the trajectory of a target 501 according to some aspects. The sensor is attached to the UAV 502 and a gimbal rotates the sensor on an axis perpendicular to a plane. For example, when the UAV 502 is flying straight and level then the plane may be parallel to the ground. The sensor emits a RADAR signal that is reflected by a target 501 as a return RADAR signal. The RADAR system, which may be part of the sensor, detects that the target 501 is in the RADAR system's field of view. An optical camera, which may be part of the sensor, captures a camera image 504 while the RADAR system indicates the target 501 may be in the camera's field of view. The camera image 504 can be provided to the onboard processing circuit as image data. The camera image 504 can contain a target image 503. The onboard processing circuit can locate the target image 503 in the camera image 504. For example, the target may be the only object in the sky. As such, the target image 503 may be the part of the camera image 504 that is not the color of the sky. The camera acquires an image that may be called the camera image. The target image 503 is the pixels in the camera image that correspond to the target.

Figure 6:
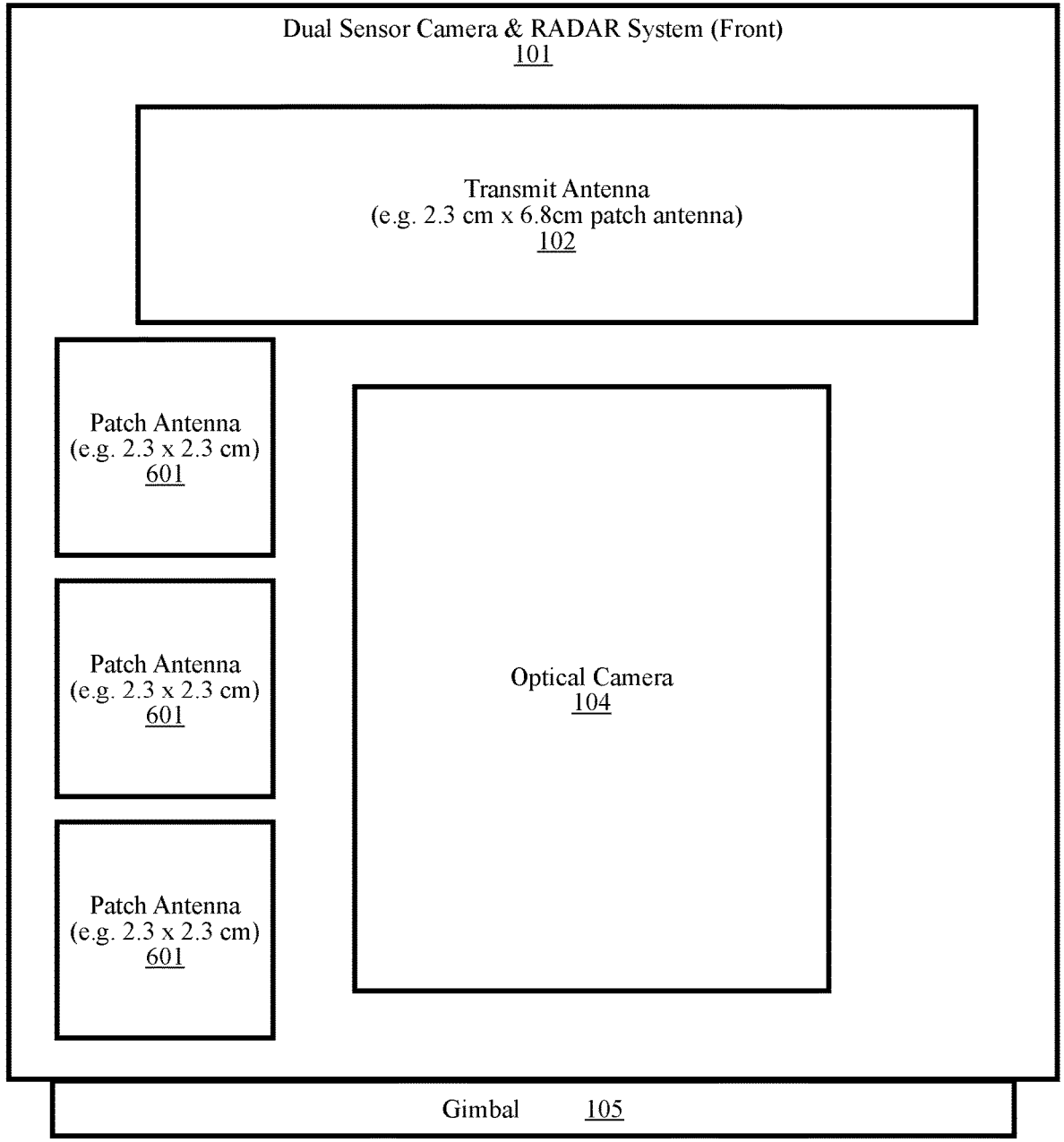
FIG. 6 is a diagram illustrating a sensor system that has three receive patch antennas according to some aspects.

FIG. 6 is a diagram illustrating a sensor system that has three receive patch antennas 601 according to some aspects. Comparing FIG. 1 and FIG. 6, the single RADAR receive antenna 103 illustrated in FIG. 1 has been replaced by three small RADAR receive patch antennas 601. The patch antennas are arranged vertically with a first one of the patch antennas above a second one of the patch antennas that is above a third one of the patch antennas. The three patch antennas may be aimed at slightly different elevations or, alternatively, the feed lines from the three patch antennas may be combined with different delays to thereby produce two or more signals having different fields of view. Those practiced in antenna arrays, particularly RADAR antenna arrays are familiar with using multiple patch antennas for beam steering and for steering fields of view. As such, the three patch antennas can be used to see different fields of view. The different fields of view may be used to more quickly locate the target image in the camera image. For example, three fields of view may be used that have different elevations. If the RADAR return signal from the target is strongest in the highest field of view, then the target image is likely to be in the upper portion of the camera image.

Figure 7:
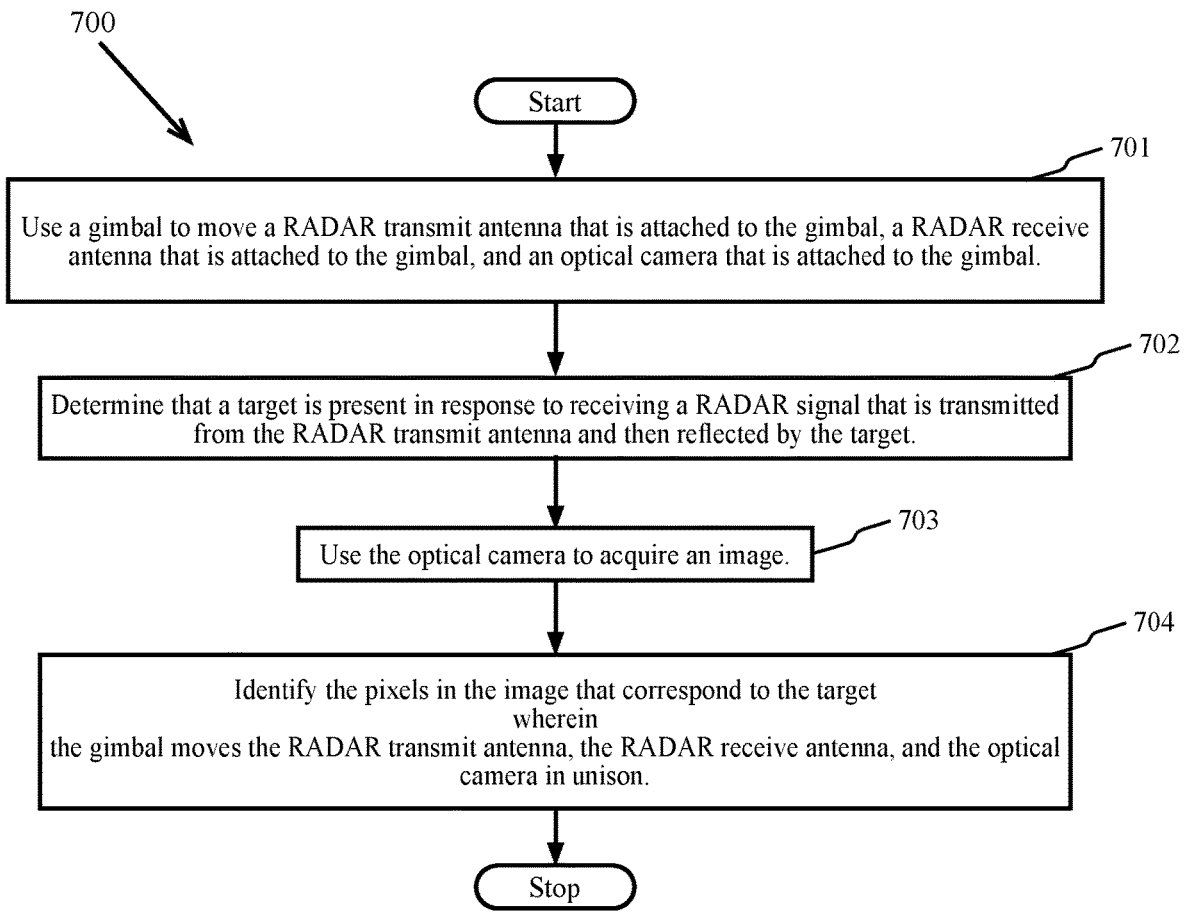
FIG. 7 is a diagram illustrating a method for obstacle avoidance for unmanned autonomous vehicles according to some aspects.

FIG. 7 is a diagram illustrating a method for obstacle avoidance for unmanned autonomous vehicles 700 according to some aspects. After the start, at block 701 the method can use a gimbal to move a RADAR transmit antenna that is attached to the gimbal, a RADAR receive antenna that is attached to the gimbal, and an optical camera that is attached to the gimbal. At block 702, the method can determine that a target is present in response to receiving a RADAR signal that is transmitted from the RADAR transmit antenna and then reflected by the target. At block 703, the method can use the optical camera to acquire a camera image. At block 704 the method can identify the pixels in the camera image that correspond to the target, wherein the gimbal moves the RADAR transmit antenna, the RADAR receive antenna, and the optical camera in unison.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A system comprising:
a gimbal;
a RADAR system that includes a RADAR transmit antenna attached to the gimbal and a RADAR receive antenna attached to the gimbal, the RADAR system having a field of view; and
an optical camera attached to the gimbal, the optical camera having a field of view;
wherein
the gimbal moves the RADAR transmit antenna, the RADAR receive antenna, and the optical camera in unison, and the RADAR system and the optical camera are boresighted to each other such that the field of view of the RADAR system overlaps with the field of view of the optical camera and the field of view of the RADAR system moves in unison with the field of view of the optical camera as the gimbal moves the RADAR transmit antenna, the RADAR receive antenna, and the optical camera in unison;

wherein:
the gimbal rotates the RADAR transmit antenna, the RADAR receive antenna, and the optical camera on an axis perpendicular to a plane;
the RADAR transmit antenna is a transmit patch antenna that has a transmit patch antenna height that is parallel to the axis and a transmit patch antenna width that is perpendicular to the transmit patch antenna height;
the patch transmit antenna width is at least twice the transmit patch antenna height;
the RADAR receive antenna is a receive patch antenna that has a receive patch antenna height that is parallel to the axis and a receive patch antenna width that is perpendicular to the receive patch antenna height; and
the receive patch antenna height is at least twice the receive patch antenna width; and
the RADAR transmit antenna is attached above the optical camera and the receive patch antenna is attached to a side of the optical camera.

2. The system of claim 1, wherein the RADAR transmit antenna and the RADAR receive antenna are tuned for 24 GHz.

3. The system of claim 1, wherein the gimbal is attached to an unmanned aerial vehicle (UAV), and the gimbal moves the RADAR transmit antenna, the RADAR receive antenna, and the optical camera relative to the UAV.

4. The system of claim 3 further including the unmanned aerial vehicle (UAV).

5. The system of claim 3 further including an onboard processing circuit, wherein:
the onboard processing circuit is on board the UAV; and
the onboard processing circuit determines that a target and the UAV are on a collision course.

6. The system of claim 1 further including a plurality of receive patch antennas that includes the RADAR receive antenna, wherein the receive patch antennas are fixedly attached to the gimbal and have a plurality of different fields of view.

7. The system of claim 6 wherein the receive patch antennas are arranged vertically stacked in parallel with the axis with a first one of the receive patch antennas above a second one of the receive patch antennas and with a third one of the receive patch antennas below the second one of the receive patch antennas.

8. The system of claim 7 wherein the plurality of receive patch antennas are bore sighted to the optical camera.

9. The system of claim 1 wherein:
the RADAR detects a target that reflects a RADAR signal transmitted by the RADAR transmit antenna and received by the RADAR receive antenna;
the optical camera acquires a camera image that includes a target image that is an image of the target; and
the optical camera acquires a camera image that includes a target image that is an image of the target; and
a processing circuit that is operatively coupled to the RADAR system and to the optical camera identifies the target image,
wherein the target image is a plurality of pixels in the camera image that corresponds to the target.

10. A method comprising:
using a gimbal to move a RADAR transmit antenna that is attached to the gimbal, a RADAR receive antenna that is attached to the gimbal, and an optical camera that is attached to the gimbal, wherein the RADAR transmit antenna, the RADAR receive antenna, and the optical camera are bore-sighted to each another;
determining that a target is present in response to receiving a RADAR signal that is transmitted from the RADAR transmit antenna and then reflected by the target;
using the optical camera to acquire a camera image when it is determined that the target is present; and
identifying a plurality of pixels in the camera image that correspond to the target wherein
the gimbal moves the RADAR transmit antenna, the RADAR receive antenna, and the optical camera in unison such that a field of view of the RADAR transmit antenna and a field of view of the RADAR receive antenna overlap with a field of view of the optical camera and the field of view of the RADAR transmit antenna and the field of view of the RADAR receive antenna move in unison with the field of view of the optical camera as the gimbal moves the RADAR transmit antenna, the RADAR receive antenna, and the optical camera in unison;

wherein:
the gimbal rotates the RADAR transmit antenna, the RADAR receive antenna, and the optical camera on an axis perpendicular to a plane;
the RADAR transmit antenna is a transmit patch antenna that has a transmit patch antenna height that is parallel to the axis and a transmit patch antenna width that is perpendicular to the transmit patch antenna height;
the patch transmit antenna width is at least twice the transmit patch antenna height;
the RADAR receive antenna is a receive patch antenna that has a receive patch antenna height that is parallel to the axis and a receive patch antenna width that is perpendicular to the receive patch antenna height; and
the receive patch antenna height is at least twice the receive patch antenna width; and
the RADAR transmit antenna is attached above the optical camera and the receive patch antenna is attached to a side of the optical camera.

11. The method of claim 10, wherein the gimbal is attached to an unmanned aerial vehicle (UAV), and the gimbal moves the RADAR transmit antenna, the RADAR receive antenna, and the optical camera relative to the UAV.

12. The method of claim 10 further including:
determining, by an onboard processing circuit, that the target and a UAV are on a collision course,
wherein the onboard processing circuit is on board the UAV.

13. The method of claim 10, further including:
using a RADAR system to identify a zone that contains the target;
using the optical camera to obtain a camera image of the zone; and
determining a target location within the camera image,
wherein
the RADAR system includes the RADAR transmit antenna and the RADAR receive antenna.

14. The method of claim 13, wherein:
the RADAR system includes a plurality of RADAR receive antennas that includes the RADAR receive antenna; and
the RADAR receive antennas are fixedly attached relative to one another and have a plurality of fields of view that are not identical fields of view.

15. The method of claim 14, wherein:
a first one of the fields of view has a first elevation; and
a second one of the fields of view has a second elevation that is lower than the first elevation.

16. The system of claim 1 wherein field of view of the RADAR system is larger than the field of view of the optical camera.

17. The system of claim 1 wherein the transmit patch antenna, the receive patch antenna, and the optical camera are mounted together on a circuit board.

18. A system comprising:
a gimbal;
a RADAR system that includes a RADAR transmit antenna attached to the gimbal and a RADAR receive antenna attached to the gimbal, the RADAR system having a field of view; and
an optical camera attached to the gimbal, the optical camera having a field of view;
wherein
the gimbal moves the RADAR transmit antenna, the RADAR receive antenna, and the optical camera in unison, and
the RADAR system and the optical camera are boresighted to each other such that the field of view of the RADAR system overlaps with the field of view of the optical camera and the field of view of the RADAR system moves in unison with the field of view of the optical camera as the gimbal moves the RADAR transmit antenna, the RADAR receive antenna, and the optical camera in unison;
wherein:
the gimbal rotates the RADAR transmit antenna, the RADAR receive antenna, and the optical camera on an axis perpendicular to a plane;
the RADAR transmit antenna is a transmit patch antenna that has a transmit patch antenna height that is parallel to the axis and a transmit patch antenna width that is perpendicular to the transmit patch antenna height;
the patch transmit antenna width is at least twice the transmit patch antenna height;
the RADAR receive antenna includes at least three receive patch antennas that have three different fields of views, wherein the at least three receive patch antennas are arranged vertically stacked in parallel with the axis with a first one of the receive patch antennas above a second one of the receive patch antennas and with a third one of the receive patch antennas below the second one of the receive patch antennas, wherein the at least three receive patch antennas have a combined receive patch antenna height that is parallel to the axis and a receive patch antenna width that is perpendicular to the receive patch antenna height;
the combined receive patch antenna height is at least twice the receive patch antenna width; and
the RADAR transmit antenna is attached above the optical camera and the at least three receive patch antennas are attached to a side of the optical camera.

19. The system of claim 18 wherein field of view of the RADAR system is larger than the field of view of the optical camera.

20. The system of claim 18 wherein the transmit patch antenna, the at least three receive patch antennas, and the optical camera are mounted together on a circuit board.

* * * * *